United States Patent [19]

Ue et al.

[11] Patent Number: 5,587,871
[45] Date of Patent: Dec. 24, 1996

[54] ELECTROLYTE SOLUTION FOR ELECTROLYTIC CAPACITOR AND ELECTROLYTIC CAPACITOR USING THE SAME

[75] Inventors: Makoto Ue; Tomohiro Sato; Masayuki Takeda, all of Ami-machi, Japan

[73] Assignee: Mitsubishi Chemical Corporation, Tokyo-to, Japan

[21] Appl. No.: 220,055

[22] Filed: Mar. 30, 1994

[30] Foreign Application Priority Data

Mar. 30, 1993 [JP] Japan .................................. 5-071808

[51] Int. Cl.$^6$ ...................................................... H01G 9/02
[52] U.S. Cl. .......................... 361/504; 361/503; 361/523; 252/62.2
[58] Field of Search .................................. 361/502–507, 361/523–527; 204/67, 69, 73 A, 59 AM, 59 QM, 129.75; 252/62.2

[56] References Cited

U.S. PATENT DOCUMENTS 2,974,108  3/1961  Alexander .
4,605,989  8/1986  Marse et al. .

FOREIGN PATENT DOCUMENTS 9224071  12/1984  Japan .
1264679  11/1986  Japan .

*Primary Examiner*—Bot L. Ledynh
*Attorney, Agent, or Firm*—Oblon, Spivak, McClelland, Maier & Neustadt, P.C.

[57] ABSTRACT

There are disclosed an electrolyte solution for an electrolytic capacitor containing an organic polar solvent and an ionic solute, and further comprising fine particles of an aluminosilicate represented by the following formula, or metal oxide fine particles covered with said aluminosilicate:

$$MAlO_2(Al_2O_3)_x(SiO_2)_y$$

wherein M represents a monovalent cation; x represents a real number of 0 to 25; and y represents a real number of 1 to 200,
and an electrolytic capacitor using said electrolyte solution.

30 Claims, No Drawings

ELECTROLYTE SOLUTION FOR ELECTROLYTIC CAPACITOR AND ELECTROLYTIC CAPACITOR USING THE SAME

BACKGROUND OF THE INVENTION

1. Field of the Invention

The present invention relates to improvement of an electrolyte solution for an electrolytic capacitor and an electrolytic capacitor using the same, particularly to an electrolyte solution for an electrolytic capacitor to which specific inorganic fine particles having a specific surface structure are added, which can maintain a high electric conductivity and a high voltage-resistance for a long time and an electrolytic capacitor using the same.

2. Prior Art

An electrolytic capacitor is generally provided with an insulating oxide film such as aluminum oxide and tantalum oxide which is formed as a dielectric layer on an anode, and also provided with a cathode so that it faces the anode, both electrodes being interposed by a separator which retains an electrolyte solution.

Said anode is usually subjected to an etching treatment to enhance the surface area. The electrolyte solution closely contacting with the concave and convex surface of the electrode functions as a substantial cathode. Thus, electric conductivity and temperature characteristics of the electrolyte solution become main factors to determine the electric characteristics of an electrolytic capacitor.

A voltage at which the insulating oxide thin film is destroyed with the increase of the load voltage on the capacitor is generally regarded as a measure of the voltage-resistance of the capacitor and so called spark voltage. If the spark voltage is higher, the voltage-resistance of the capacitor is higher. The spark voltage depends on the composition of the electrolyte solution used. Therefore, the electrolyte solution is an important element which determines the properties of the electrolytic capacitor.

Conventionally, for the purpose of increasing the spark voltage while less decrease in the electric conductivity of the electrolyte solution, adding oxide fine particles to an electrolyte solution for an electrolytic capacitor has been known. For example, an electrolyte solution in which silica fine particles are added (Japanese Provisional Patent Publication No. 12512/1992) and an electrolyte solution in which aluminum oxide, zirconium oxide, antimony oxide, tantalum oxide or titanium oxide is added (Japanese Provisional Patent Publications Nos. 145612/1992 to 145616/1992) are described.

However, an electrolyte solution comprising such fine particles has a disadvantage that it cannot maintain the high voltage-resistance at a temperature as high as 105° C., since the colloid is unstable at such high temperatures and resulting the short life of a capacitor. It has another disadvantage that a small amount of water present in the electrolyte solution, for example, from moisture or produced by the esterification reaction of acid solutes and alcohol solvents accelerates the gelation of the electrolyte solution, resulting in the decrease of the voltage-resistance.

SUMMARY OF THE INVENTION

An object of the present invention is to provide an electrolyte solution for an electrolytic capacitor which suppresses the decrease of the electric conductivity, remarkably improves the voltage-resistance, and can maintain the high voltage-resistance at high temperatures for a long time.

An another object of the present invention is to provide an electrolytic capacitor which uses said electrolyte solution.

The present invention is an electrolyte solution for an electrolytic capacitor containing an organic polar solvent and an ionic solute, characterized in that said electrolyte solution further comprises fine particles of an aluminosilicate represented by the following formula or fine particles of metal oxide covered with said aluminosilicate:

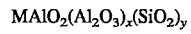

$$MAlO_2(Al_2O_3)_x(SiO_2)_y$$

wherein M represents a monovalent cation; x represents a real number of 0 to 25; and y represents a real number of 1 to 200.

The electrolytic capacitor of the present invention has an electrode for anode and an electrode for cathode which is facing said electrode for anode, both electrodes being mediated by a separator which maintains an electrolyte solution, characterized by using the above electrolyte solution.

DESCRIPTION OF THE PREFERRED EMBODIMENT

In the following, the present invention is explained in detail.

An electrolyte solution used for the electrolytic capacitor of the present invention comprises an organic polar solvent and an ionic solute.

An organic polar solvent to be used in the electrolyte solution may include, for example, an amide solvent such as N-methylformamide, N-ethylformamide, N,N-dimethylformamide, N,N-diethylformamide, N-ethylacetamide, N,N-dimethylacetamide and N-methylpyrrolidone; a lactone solvent such as γ-butyrolactone, γ-valerolactone and δ-valerolactone; a carbonate solvent such as ethylene carbonate, propylene carbonate and butylene carbonate; an alcohol solvent such as ethylene glycol, glycerin and methyl cellosolve; a nitrile solvent such as 3-methoxypropionitrile and glutaronitrile; a phosphoric acid ester solvent such as trimethyl phosphate and triethyl phosphate; and a mixture of 2 or more kinds of the above solvents. Particularly, a solvent mainly comprising ethylene glycol or γ-butyrolactone is preferred.

As an ionic solute to be used as an electrolyte in the electrolyte solution, a known acid and a salt thereof which is usable as a solute in a conventional electrolyte solution can be used. Such an acid may be mentioned an inorganic acid and an organic acid including, for example, an inorganic acid such as boric acid (complex with mannitol), phosphoric acid, silicic acid and $HBF_4$; an aliphatic monocarboxylic acid such as formic acid, acetic acid, propionic acid and enanthic acid; an aliphatic dicarboxylic acid such as malonic acid, succinic acid, glutaric acid, adipic acid, methylmalonic acid, pimellic acid, suberic acid, azelaic acid, sebacic acid, decanedicarboxylic acid, maleic acid and citraconic acid; and an aromatic carboxylic acid such as benzoic acid, phthalic acid, salicylic acid, toluic acid and pyromellitic acid. A salt may include a salt of the above organic or inorganic acid, for example, an ammonium salt; a monoalkylammonium salt such as methylammonium, ethylammonium and propylammonium; a dialkylammonium salt such as dimethylammonium, diethylammonium, ethylmethylammonium and dibutylammonium; a trialkylammonium salt such as trimethylammonium, triethylammonium and tributylammonium; a quaternary ammonium salt such as tetramethylammonium, triethylmethylammonium, tetraethylammonium, tetrabutylammonium and N,N-dimethylpyrrolidinium; a phosphonium salt and a quaternary phosphonium salt; an arsonium salt; and a sulfonium salt. The ionic solute may be used singly or in combination. The content of the ionic solute, which varies depending on the required characteristics, is generally 1 to 40% by weight, preferably 1 to 25% by weight, more preferably 5 to 25% by weight based on the total weight of the fundamental electrolyte solution.

The aluminosilicate to be used in the electrolyte solution of the present invention is represented by the above formula. The monovalent cation (M) may include, for example, an alkali metal cation such as a sodium ion; an onium cation usable for an ionic solute as mentioned above such as an ammonium, a secondary ammonium, a tertiary ammonium and a quaternary ammonium; and a monovalent cation such as a proton, and among them, an alkali metal cation is preferred and a sodium ion is most preferred.

The Al/Si ratio (i.e., $(2x+1)/y$ in the formula) in the aluminosilicate is preferably 0.02 to 1, more preferably 0.02 to 0.8. If an amount of Al is too little based on Si, the potent negative charge points due to the aluminosilicate structure on the surface, which stably maintain the colloidal condition of the particle, are undesirably decreased. If the amount of Al is too large based on Si, the aluminosilicate structure cannot undesirably be maintained.

In the metal oxide fine particle covered with aluminosilicate, the whole surface of the core of the fine particle should be covered with a shell of aluminosilicate. In order to cover the whole surface, the shell usually has a thickness of 1 to 5 nm. The metal oxide used for the core of the fine particle may include, for example, $SiO_2$, $Al_2O_3$, $TiO_2$, $ZrO_2$, $Sb_2O_3$ and $Ta_2O_5$, or a mixed metal oxide thereof, and most preferably $SiO_2$.

The aluminosilicate fine particle or the metal oxide fine particle covered with the aluminosilicate (hereinafter referred to simply as "fine particle") preferably has a particle size of 3 to 150 nm, more preferably 10 to 50 nm. If the particle size is too small, an association of the fine particles rapidly progresses in the electrolyte solution at high temperatures, and the high voltage-resistance cannot be maintained. On the other hand, if the particle size is too large, it is difficult to disperse the particles colloidally in the electrolyte solution and the high improving effect on the voltage-resistance cannot be obtained.

The addition amount of the above fine particles is preferably 0.1 to 20 parts by weight, more preferably 1 to 10 parts by weight based on 100 parts by weight of the fundamental electrolyte solution. If the amount is too small, an improving effect on the voltage-resistance cannot be sufficiently obtained. If the amount is too large, the electric conductivity is lowered.

The fine particles are preferably added as a sol in which the particles are dispersed in an appropriate solvent. By adding as a sol, it is easily possible to disperse the particles stably and colloidally in the electrolyte solution avoiding the association of the fine particles.

The aluminosilicate used in the present invention is preferably prepared, for example, as disclosed in U.S. Pat. No. 2,974,108, by simultaneously and gradually adding a silicic acid aqueous solution and a sodium aluminate aqueous solution, in such a ratio that the required molar ratio of aluminosilicate is obtained, to a diluted sodium hydroxide aqueous solution under stirring for build-up of the colloidal particles, and then removing the sodium ingredient by using a cation exchange resin. Then, the solution containing the aluminosilicate is replaced with an appropriate solvent and concentrated to have the sol to be added to the electrolyte solution. The metal oxide fine particles covered with aluminosilicate can be similarly prepared by simultaneously and gradually adding a silicic acid aqueous solution and a sodium aluminate aqueous solution, in such a ratio and amounts of both solutions that the required molar ratio of aluminosilicate surface and thickness is obtained, for example, to a silica sol so as to cause the aluminosilicate having a thickness of 1 to 5 nm to develop on the surface of the silica. Then, the sol containing the metal oxide fine particles covered with developed aluminosilicate is replaced with an appropriate solvent and concentrated to have the sol to be added to the electrolyte solution.

In the aluminosilicate obtained by the method as mentioned above, x in the above formula is a real number usually within the range of 0 to 2.5 and y is a real number usually within the range of 1 to 50.

The solid content of the fine particles in the sol is preferably 1 to 50% by weight, more preferably 10 to 40% by weight. If the concentration is too high, the sol is easily gelled, while if the concentration is too low, the concentration control of the solute in the electrolyte solution would not be easily regulated. As the solvent to be used in the sol, there may be mentioned an organic polar solvent to be used in the aforesaid electrolyte solution.

EXAMPLES

In the following, the present invention is explained in detail by referring to Examples and Comparative examples.

EXAMPLES 1 TO 6

An electrolyte solution for an electrolytic capacitor containing an aluminosilicate fine particle having the composition shown in Table 1 was prepared and the electric conductivity and the spark voltage of the electrolyte solution were measured. The results are shown in Table 1. The aluminosilicate fine particle used had the formula of $NaAlO_2(Al_2O_3)_{0.59}(SiO_2)_{6.25}$ and had a mean particle size of 30 nm. The fine particle was prepared as an ethylene glycol sol; the above sol was colloidally dispersed in the electrolyte solution in which each electrolyte (an ionic solute) was dissolved so as to prepare the electrolyte solution.

Using the thus prepared electrolyte solution, the electric conductivity and the spark voltage were measured. The electric conductivity was measured at 25° C., and as for the spark voltage, a voltage at which a dielectric breakdown was observed at first when a constant current anodic oxidation was carried out at 25° C. at a current density of 5 mA/cm$^2$ using an aluminum foil as an electrode was measured. The results are shown in Table 1.

COMPARATIVE EXAMPLES 1 TO 6

An electrolyte solution was prepared in the same manner as in Examples 1 to 6 except that the aluminosilicate fine particles were not used. The electric conductivity and the spark voltage of the electrolyte solution were measured in the same manner as in Examples 1 to 6. The results are shown in Table 1.

TABLE 1

| | Composition of electrolyte | (% by weight) | (parts by weight) | Electric conductivity (mS/cm) | Spark voltage (V) |
|---|---|---|---|---|---|
| Example 1 | Ammonium 1,6-decanedicarboxylate | 17.5 | 100 | 2.0 | 390 |
| | Ethylene glycol | 82.5 | | | |
| | Aluminosilicate | | 5 | | |
| Comparative example 1 | Ammonium 1,6-decanedicarboxylate | 17.5 | | 2.3 | 350 |
| | Ethylene glycol | 82.5 | | | |
| Example 2 | Ammonium adipate | 8.8 | 100 | 2.6 | 420 |
| | Ethylene glycol | 91.2 | | | |
| | Aluminosilicate | | 5 | | |
| Comparative example 2 | Ammonium adipate | 8.8 | | 3.1 | 380 |
| | Ethylene glycol | 91.2 | | | |
| Example 3 | Ammonium benzoate | 8.4 | 100 | 1.7 | 405 |
| | Ethylene glycol | 87.4 | | | |
| | Boric acid | 2.5 | | | |
| | Mannitol | 1.7 | | | |
| | Aluminosilicate | | 5 | | |
| Comparative example 3 | Ammonium benzoate | 8.4 | | 2.0 | 360 |
| | Ethylene glycol | 87.4 | | | |
| | Boric acid | 2.5 | | | |
| | Mannitol | 1.7 | | | |
| Example 4 | | | | | |
| 1 | Tetramethylammonium phthalate | 18.5 | 100 | 7.8 | 100 |
| | γ-butyrolactone | 55.5 | | | |
| | Ethylene glycol | 25.9 | | | |
| | Aluminosilicate | | 2 | | |
| 2 | Tetramethylammonium phthalate | 18.5 | 100 | 7.5 | 110 |
| | γ-butyrolactone | 55.5 | | | |
| | Ethylene glycol | 25.9 | | | |
| | Aluminosilicate | | 5 | | |
| Comparative example 4 | Tetramethylammonium phthalate | 18.5 | | 8.0 | 90 |
| | γ-butyrolactone | 55.5 | | | |
| | Ethylene glycol | 25.9 | | | |
| Example 5 | Triethylmethylammonium maleate | 22 | 100 | 12.0 | 160 |
| | γ-butyrolactone | 66 | | | |
| | Ethylene glycol | 12 | | | |
| | Aluminosilicate | | 5 | | |
| Comparative example 5 | Triethylmethylammonium maleate | 22 | | 12.8 | 80 |
| | γ-butyrolactone | 66 | | | |
| | Ethylene glycol | 12 | | | |
| Example 6 | Triethylammonium maleate | 17.5 | 100 | 6.1 | 170 |
| | γ-butyrolactone | 70 | | | |
| | Ethylene glycol | 12.5 | | | |
| | Aluminosilicate | | 5 | | |
| Comparative example 6 | Triethylammonium maleate | 17.5 | | 6.8 | 100 |
| | γ-butyrolactone | 70 | | | |
| | Ethylene glycol | 12.5 | | | |

EXAMPLE 7

An electrolyte solution was prepared in the same manner as in Examples 1 to 6 except that the aluminosilicate fine particle used had the formula: $NaAlO_2(Al_2O_3)_{0.54}(SiO_2)_{9.76}$ and had a mean particle size of 30 nm.

The electric conductivity ad te spark voltage was measured in the same manner as in Examples 1 to 6. The results are given as follows.

Electric conductivity: 2.0 mS/cm

Spark voltage: 390 V

EXAMPLE 8

An electrolyte solution was prepared in the same manner as in Examples 1 to 6 except that the aluminosilicate fine particle used had the formula: $NaAlO_2(Al_2O_3)_{0.37}(SiO_2)_{7.23}$ and had a mean particle size of 30 nm.

The electric conductivity ad te spark voltage was measured in the same manner as in Examples 1 to 6. The results are given as follows.

Electric conductivity: 2.0 mS/cm

Spark voltage: 390 V

EXAMPLES 9 TO 14

An electrolyte solution was prepared in the same manner as in Examples 1 to 6 except that the aluminosilicate fine particles were replaced with metal oxide fine particles covered with aluminosilicate as below, as Examples 9 to 14, respectively. The used metal oxide fine particles covered with aluminosilicate are fine particles having the core made of silica and having a thickness of the aluminosilicate shell of about 1 nm and an average particle size of 35 nm, which were prepared by adding a silicic acid aqueous solution and a sodium aluminate aqueous solution to a silica sol so that the same composition at the shell layer as the aluminosilicate in Examples 1 to 6 can be obtained. Also, the metal oxide fine particles covered with aluminosilicate had a composition of 94.68% by weight of $SiO_2$, 2.96% by weight of $Al_2O_3$ and 2.36% by weight of $Na_2O$, as the whole. The covered fine particle was used as an ethylene glycol sol; the above sol was colloidally dispersed in an electrolyte solution in which each ionic solute was dissolved so as to prepare the electrolyte solution. The electric conductivity and the spark voltage were measured in the same manner as in Examples 1 to 6. The results are shown in Table 2.

COMPARATIVE EXAMPLES 7 TO 12

An electrolyte solution was prepared in the same manner as in Examples 7 to 12 except that the metal oxide fine particles covered with aluminosilicate were not used. The electric conductivity and the spark voltage were measured in the same manner as in Examples 9 to 14. The results are shown in Table 2.

lyte solution were measured. The results are shown in Table 3.

COMPARATIVE EXAMPLES 13 AND 14

An electrolyte solution was prepared in the same manner as in Examples 15 and 16 except that silica fine particles or alumina fine particles was used in place of the aluminosilicate fine particle or the silica fine particle covered with aluminosilicate, respectively, as Comparative examples 13 and 14. The silica and the alumina used in Comparative examples 7 and 8 had an average particle size of 30 nm, respectively, and the electrolyte solution was prepared in the same manner as in Examples 5 and 13. The changes of the

TABLE 2

|  | Composition of electrolyte | (% by weight) | (parts by weight) | Electric conductivity (mS/cm) | Spark voltage (V) |
| --- | --- | --- | --- | --- | --- |
| Example 9 | Ammonium 1,6-decanedicarboxylate | 17.5 | 100 | 2.0 | 380 |
|  | Ethylene glycol | 82.5 |  |  |  |
|  | Silica covered with aluminosilicate |  | 5 |  |  |
| Comparative example 7 | Ammonium 1,6-decanedicarboxylate | 17.5 |  | 2.3 | 330 |
|  | Ethylene glycol | 82.5 |  |  |  |
| Example 10 | Ammonium adipate | 8.8 | 100 | 2.6 | 400 |
|  | Ethylene glycol | 91.2 |  |  |  |
|  | Silica covered with aluminosilicate |  | 5 |  |  |
| Comparative example 8 | Ammonium adipate | 8.8 |  | 3.1 | 360 |
|  | Ethylene glycol | 91.2 |  |  |  |
| Example 11 | Ammonium benzoate | 8.4 | 100 | 1.7 | 400 |
|  | Ethylene glycol | 87.4 |  |  |  |
|  | Boric acid | 2.5 |  |  |  |
|  | Mannitol | 1.7 |  |  |  |
|  | Silica covered with aluminosilicate |  | 5 |  |  |
| Comparative example 9 | Ammonium benzoate | 8.4 |  | 2.0 | 340 |
|  | Ethylene glycol | 87.4 |  |  |  |
|  | Boric acid | 2.5 |  |  |  |
|  | Mannitol | 1.7 |  |  |  |
| Example 12 |  |  |  |  |  |
| 1 | Tetramethylammonium phthalate | 18.5 | 100 | 7.8 | 100 |
|  | γ-butyrolactone | 55.5 |  |  |  |
|  | Ethylene glycol | 25.9 |  |  |  |
|  | Silica covered with aluminosilicate |  | 2 |  |  |
| 2 | Tetramethylammonium phthalate | 18.5 | 100 | 7.5 | 110 |
|  | γ-butyrolactone | 55.5 |  |  |  |
|  | Ethylene glycol | 25.9 |  |  |  |
|  | Silica covered with aluminosilicate |  | 5 |  |  |
| Comparative example 10 | Tetramethylammonium phthalate | 18.5 |  | 8.0 | 90 |
|  | γ-butyrolactone | 55.5 |  |  |  |
|  | Ethylene glycol | 25.9 |  |  |  |
| Example 13 | Triethylmethylammonium maleate | 22 | 100 | 12.0 | 150 |
|  | γ-butyrolactone | 66 |  |  |  |
|  | Ethylene glycol | 12 |  |  |  |
|  | Silica covered with aluminosilicate |  | 5 |  |  |
| Comparative example 11 | Triethylmethylammonium maleate | 22 |  | 12.8 | 80 |
|  | γ-butyrolactone | 66 |  |  |  |
|  | Ethylene glycol | 12 |  |  |  |
| Example 14 | Triethylammonium maleate | 17.5 | 100 | 6.1 | 160 |
|  | γ-butyrolactone | 70 |  |  |  |
|  | Ethylene glycol | 12.5 |  |  |  |
|  | Silica covered with aluminosilicate |  | 5 |  |  |
| Comparative example 12 | Triethylammonium maleate | 17.5 |  | 6.8 | 100 |
|  | γ-butyrolactone | 70 |  |  |  |
|  | Ethylene glycol | 12.5 |  |  |  |

EXAMPLES 15 TO 16

The electrolyte solutions obtained in Examples 5 and 13 were kept at 110° C. for 500 hours, respectively, and the electric conductivity and the spark voltage of each electrolyte solutions were measured. The results are shown in Table 3 as Comparative examples.

TABLE 3

| | Composition of electrolyte | (% by weight) | (parts by weight) | Electric conductivity (mS/cm) First | Electric conductivity (mS/cm) After 500 hrs. | Spark voltage (V) First | Spark voltage (V) After 500 hrs. |
|---|---|---|---|---|---|---|---|
| Example 15 | TEMAM* <br> γ-butyrolactone <br> Ethylene glycol <br> Aluminosilicate | 22 <br> 66 <br> 12 | 100 <br><br><br> 5 | 12.0 | 11.5 | 160 | 160 |
| Example 16 | TEMAM* <br> γ-butyrolactone <br> Ethylene glycol <br> Silica covered with aluminosilicate | 22 <br> 66 <br> 12 | 100 <br><br><br> 5 | 12.0 | 11.5 | 160 | 160 |
| Comparative example 13 | TEMAM* <br> γ-butyrolactone <br> Ethylene glycol <br> Silica | 22 <br> 66 <br> 12 | 100 <br><br><br> 5 | 12.0 | 11.5 | 160 | 100 |
| Comparative example 14 | TEMAM* <br> γ-butyrolactone <br> Ethylene glycol <br> Alumina | 22 <br> 66 <br> 12 | 100 <br><br><br> 5 | 11.8 | 11.2 | 110 | 80 |

*Triethylmethylammonium maleate

The fine particles used in the electrolyte solution for electrolytic capacitor of the present invention has potent negative charge points due to the aluminosilicate structure on the surface. Therefore, the fine particle is surrounded by electrolyte cations in the electrolyte, and the colloid which carries a positive charge as a whole maintains the stable colloidal condition due to repelling of the positive charges. Therefore, by having the aluminosilicate structure on the surface, the stability of the electrolyte solution having the fine particle is remarkably improved, free from degradation such as gelation due to a small amount of water contained in the electrolyte solution, and the degradation such as the gelation of the electrolyte solution at a high temperature can be prevented so that the improving effect on the voltage-resistance can be maintained for a long time. Also, the decrease of the electric conductivity can be prevented, and the spark voltage can be heightened, so that an electrolytic capacitor having a high voltage-resistance and having a long life span can be provided.

We claim:

1. An electrolyte solution for an electrolytic capacitor containing an organic polar solvent and an ionic solute, characterized in that said electrolyte solution further comprises fine particles of an aluminosilicate represented by the following formula:

$$MAlO_2(Al_2O_3)_x(SiO_2)_y$$

wherein M represents a monovalent cation; x represents a real number of greater than 0 to 25; and y represents a real number of 1 to 200.

2. The electrolyte solution according to claim 1, wherein the aluminosilicate has an Al/Si ratio of 0.02 to 1.

3. The electrolyte solution according to claim 1, wherein the aluminosilicate has an Al/Si ratio of 0.02 to 0.8.

4. The electrolyte solution according to claim 1, wherein M of said aluminosilicate is selected from the group consisting of an alkali metal cation and an onium cation.

5. The electrolyte solution according to claim 1, wherein M of said aluminosilicate is an alkali metal cation.

6. The electrolyte solution according to claim 4, wherein M of said aluminosilicate is sodium cation.

7. The electrolyte solution according to claim 1, wherein said aluminosilicate fine particle has a particle size of 3 to 150 nm.

8. The electrolyte solution according to claim 1, wherein said aluminosilicate fine particle has a particle size of 10 to 50 nm.

9. The electrolyte solution according to claim 1, wherein said aluminosilicate fine particle is added to the electrolyte solution in an amount of 0.1 to 20 parts by weight based on 100 parts by weight of the electrolyte solution.

10. The electrolyte solution according to claim 1, wherein said aluminosilicate fine particle is added to the electrolyte solution in an amount of 1 to 10 parts by weight based on 100 parts by weight of the electrolyte solution.

11. The electrolyte solution according to claim 1, said electrolyte solution is obtained by adding said aluminosilicate fine particles to the electrolyte solution as a sol in which the fine particles are dispersed in a solvent.

12. The electrolyte solution according to claim 11, wherein said aluminosilicate fine particles is used in said sol in a concentration of 1 to 50% by weight.

13. The electrolyte solution according to claim 11, wherein said aluminosilicate fine particles is used in said sol in a concentration of 10 to 40% by weight.

14. An electrolytic capacitor having an electrode for anode, and an electrode for cathode which is facing said electrode for anode, both electrodes being interposed by a separator which maintains an electrolyte solution, characterized by using the electrolyte solution according to claim 1.

15. An electrolyte solution for an electrolytic capacitor containing an organic polar solvent and an ionic solute, characterized in that said electrolyte solution further comprises fine particles of metal oxide covered with an aluminosilicate represented by the following formula:

$$MAlO_2(Al_2O_3)_x(SiO_2)_y$$

wherein M represents a monovalent cation; x represents a real number of greater than 0 to 25; and y represents a real number of 1 to 200.

16. The electrolyte solution according to claim 15, wherein the aluminosilicate has an Al/Si ratio of 0.02 to 1.

17. The electrolyte solution according to claim 15, wherein the aluminosilicate has an Al/Si ratio of 0.02 to 0.8.

18. The electrolyte solution according to claim 15, wherein M of said aluminosilicate is selected from the group consisting of an alkali metal cation and an onium cation.

19. The electrolyte solution according to claim 15, wherein M of said aluminosilicate is an alkali metal cation.

20. The electrolyte solution according to claim 18, wherein M of said aluminosilicate is sodium cation.

21. The electrolyte solution according to claim 15, wherein the metal oxide is selected from the group consisting of $SiO_2$, $Al_2O_3$, $TiO_2$, $ZrO_2$, $Sb_2O_3$, $Ta_2O_5$ and a complex oxide thereof.

22. The electrolyte solution according to claim 15, wherein the metal oxide is $SiO_2$.

23. The electrolyte solution according to claim 15, wherein said metal oxide fine particle covered with said aluminosilicate has a particle size of 3 to 150 nm.

24. The electrolyte solution according to claim 15, wherein said metal oxide fine particle covered with said aluminosilicate has a particle size of 10 to 50 nm.

25. The electrolyte solution according to claim 15, wherein said metal oxide fine particles covered with said aluminosilicate is added to the electrolyte solution in an amount of 0.1 to 20 parts by weight based on 100 parts by weight of the electrolyte solution.

26. The electrolyte solution according to claim 15, wherein said metal oxide fine particle covered with said aluminosilicate is added to the electrolyte solution in an amount of 1 to 10 parts by weight based on 100 parts by weight of the electrolyte solution.

27. The electrolyte solution according to claim 15, said electrolyte solution is obtained by adding said metal oxide fine particles covered with said aluminosilicate to the electrolyte solution as a sol in which the fine particles are dispersed in a solvent.

28. The electrolyte solution according to claim 27, wherein said metal oxide fine particles covered with said aluminosilicate is used in said sol in a concentration of 1 to 50% by weight.

29. The electrolyte solution according to claim 27, wherein said metal oxide fine particles covered with said aluminosilicate is used in said sol in a concentration of 10 to 40% by weight.

30. An electrolytic capacitor having an electrode for anode, and an electrode for cathode which is facing said electrode for anode, both electrodes being interposed by a separator which maintains an electrolyte solution, characterized by using the electrolyte solution according to claim 15.

* * * * *